United States Patent [19]
Hiroki

[11] Patent Number: 5,732,070
[45] Date of Patent: Mar. 24, 1998

[54] COMMUNICATION CONTROL APPARATUS

[75] Inventor: Shigeru Hiroki, Hiratsuka, Japan

[73] Assignee: Canon Kabushiki Kaisha, Tokyo, Japan

[21] Appl. No.: 749,184

[22] Filed: Nov. 14, 1996

Related U.S. Application Data

[63] Continuation of Ser. No. 495,035, Jun. 27, 1995, abandoned, which is a continuation of Ser. No. 176,510, Jan. 3, 1994, abandoned, which is a continuation of Ser. No. 884,174, May 18, 1992, abandoned.

[30] Foreign Application Priority Data

Jun. 10, 1991 [JP] Japan ................................ 3-137823

[51] Int. Cl.$^6$ .................................................. H04J 3/14
[52] U.S. Cl. .................. 370/241; 370/420; 370/522; 340/825.52
[58] Field of Search ................ 340/825.52, 825.53, 340/825.51, 825.16, 825.07, 825.08, 825.15, 825.54, 825.44; 395/180, 181, 182.01, 182.02, 182.03, 182.04, 182.08, 182.13, 182.16, 182.17, 182.19, 182.2, 182.21, 185.01, 185.02, 185.07; 370/216, 241, 242, 243, 244, 245, 475, 252, 254, 389, 420, 421, 463, 522, 524; 379/399, 350, 372

[56] References Cited

U.S. PATENT DOCUMENTS

| | | | |
|---|---|---|---|
| 4,558,416 | 12/1985 | Pauwel et al. | 371/15 |
| 4,672,662 | 6/1987 | Nishino et al. | 370/58.1 |
| 4,835,769 | 5/1989 | Donaghue, Jr. et al. | 370/110.1 |
| 4,879,715 | 11/1989 | Nakabayashi et al. | 370/92 |
| 4,930,123 | 5/1990 | Shimizu | 370/94.1 |
| 4,963,862 | 10/1990 | Nakaboyashi et al. | 370/92 |
| 5,012,470 | 4/1991 | Shobu et al. | 370/99 |
| 5,067,125 | 11/1991 | Tsuchida | 370/60 |
| 5,125,082 | 6/1992 | Fujiwara | 395/325 |
| 5,142,525 | 8/1992 | Nakatsuma | 370/110.1 |
| 5,157,660 | 10/1992 | Kuwahara et al. | 370/95.1 |
| 5,157,662 | 10/1992 | Tadamura et al. | 370/60.1 |
| 5,257,400 | 10/1993 | Yoshida | 379/63 |
| 5,317,693 | 5/1994 | Cuenod et al. | 370/85.7 |

FOREIGN PATENT DOCUMENTS

| | | |
|---|---|---|
| A 0325794 | 2/1989 | European Pat. Off. |
| A 0323083 | 5/1989 | European Pat. Off. |
| 2-2783 | 8/1990 | Japan |
| A 220544 | 10/1990 | United Kingdom |

*Primary Examiner*—Wellington Chin
*Assistant Examiner*—Huy D. Vu
*Attorney, Agent, or Firm*—Fitzpatrick, Cella, Harper & Scinto

[57] ABSTRACT

Disclosed is a communications-exchange apparatus which can re-establish a communication link with a plurality of terminals using a re-assigned TEI after the apparatus is reset. When the exchange is reset, built-in Terminal Endpoint Identifier (TEI) management procedure execution unit 202 sets the contents of a TEI table 204 to "not-in-use" and performs a TEI check procedure on an ISDN transmission path 106. The TEI management procedure execution unit 202 sets the status of the TEI table 204 corresponding to a TEI confirmed to have been used to "in-use", or performs a TEI removal procedure.

23 Claims, 6 Drawing Sheets

| TEI | STATUS |
|---|---|
| 0 | IN-USE / NOT IN USE |
| 1 | IN-USE / NOT IN USE |
| 2 | IN-USE / NOT IN USE |
| ... | ... |
| 63 | IN-USE / NOT IN USE |

FIG. 3

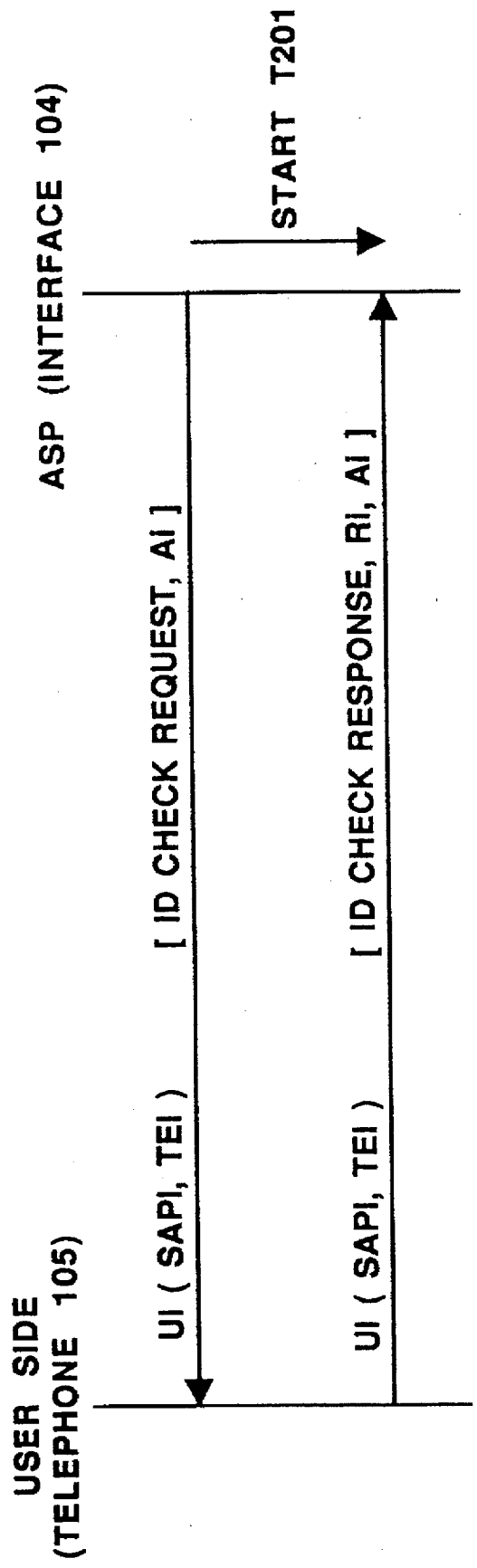
F I G. 5

COMMUNICATION CONTROL APPARATUS

This application is a continuation of application Ser. No. 08/495,035 filed Jun. 27, 1995 now abandoned, which is a continuation of application Ser. No. 08/176,510 filed Jan. 3, 1994, abandoned, which is a continuation of application Ser. No. 07/884,174 filed May 18, 1992, abandoned.

BACKGROUND OF THE INVENTION

Present invention relates to a communication control apparatus which controls communication among a plurality of terminals connected to a single data transmission path.

In an integrated services digital network (ISDN) interface, terminal endpoint identifier (TEI) management procedures for a data link layer (layer 2) regulated in CCITT Recommendation Q.921, Vol. VI, Fascicle VI. 10 are: 1) a TEI assignment procedure; 2) a TEI check procedure; 3) a TEI removal procedure; and 4) a TEI identity verify procedure.

The purposes of these procedures are to: a) allow automatic TEI equipment to request the network to assign a TEI value that the data link layer entities within the requesting user equipment will use in their subsequent communications; b) allow a network to remove a previously assigned TEI value from specific or all user equipments; c) allow a network to check whether a TEI value is in-use, or whether multiple TEI assignment has occurred; and d) allow user equipment the option to request that the network invoke the TEI check procedure. Automatic TEI will be abbreviated to "TEI" hereinafter.

A telephone exchange apparatus having an ISDN network side interface unit according to the CCITT Recommendation starts the TEI assignment procedure on reception of an identity request from an ISDN terminal or the TEI identity verify procedure on reception of an identity verify request from the ISDN terminal, and then performs the TEI management procedures with the ISDN terminal.

The TEI check procedure is used in TEI audit and recovery procedures. The TEI check procedure allows the network side layer management entity either to establish that a TEI value is in-use or to verify multiple TEI assignment. The TEI identity verify procedure allows the user side layer management entity to have the capability to request that the network invoke the identity check procedure for verification of multiple TEI assignment. The TEI identity verify procedure is optional for both the network and user equipment. In the above prior art, in case an ISDN network side interface unit is reset due to some malfunction in the telephone exchange apparatus after the TEI assignment procedure to assign an ISDN terminal a TEI, the status of the assigned TEI in the ISDN network side interface unit changes to "not-in-use" because of the reset, while the status of the assigned TEI on the ISDN terminal side is kept "in-use".

In this condition, even if the ISDN terminal requests to set a communication link with the abovementioned TEI, the ISDN network side interface unit ignores the communication link setting request since the interface unit recognizes that the request has been made with the unassigned TEI, thus the communication link can not be set.

The TEI identity verify procedure in the protocols for layer 2 is provided to avoid such drawback, however, as described above, this procedure is optional and all ISDN terminals are not provided with the TEI identity verify procedure. Some terminals which are incapable of this procedure cannot establish a communication link.

Further, even when an ISDN terminal is provided with the TEI identity verify procedure, setting a communication link occasionally fails to be completed before a reception response timer in the network side layer management entity times out. More specifically, the terminal comprising the TEI identity verify procedure starts the TEI check procedure accompanied by the TEI identity verify procedure and then removes the assigned TEI with the TEI removal procedure. Next, the terminal performs the TEI assignment procedure where a TEI is re-assigned to the terminal. The terminal again requests to set a communication link with the re-assigned TEI. However, when the reception response timer times out before the network side interface unit responds to the terminal, the communication link cannot be established.

SUMMARY OF THE INVENTION

An object of the present invention is to provide a communication control apparatus and system which are capable of feasibly making an agreement of terminal-identifier assignments between the communication control apparatus and terminals which are connected to the control apparatus.

Another object of the present invention is to provide the communication control apparatus and system which can be applied to ISDN interface procedures.

Further object of the present invention is to provide the communication control apparatus and system which can make the agreement of the assignments by initializing identifier assignment statuses of the terminals.

Yet further object of the present invention is to provide the communication control apparatus and system which can make the agreement by updating the storage means for storing terminal identifier data in accordance with identifier assignment statuses of the terminals before the exchange apparatus is reset.

Other objects and advantages besides those discussed above shall be apparent to those skilled in the art from the description of a preferred embodiment of the invention which will follow. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a connection diagram of a telephone exchange apparatus and terminals which the present invention is reduced to;

FIG. 3 is a diagram showing the structure of a TEI table;

FIG. 5 is a diagram explaining the operation of the TEI check procedure used in the first and a second embodiments.

DETAILED DESCRIPTION OF THE PREFERRED EMBODIMENTS

Preferred embodiments of the present invention will be described in detail in accordance with the accompanying drawings.

Figure 1:
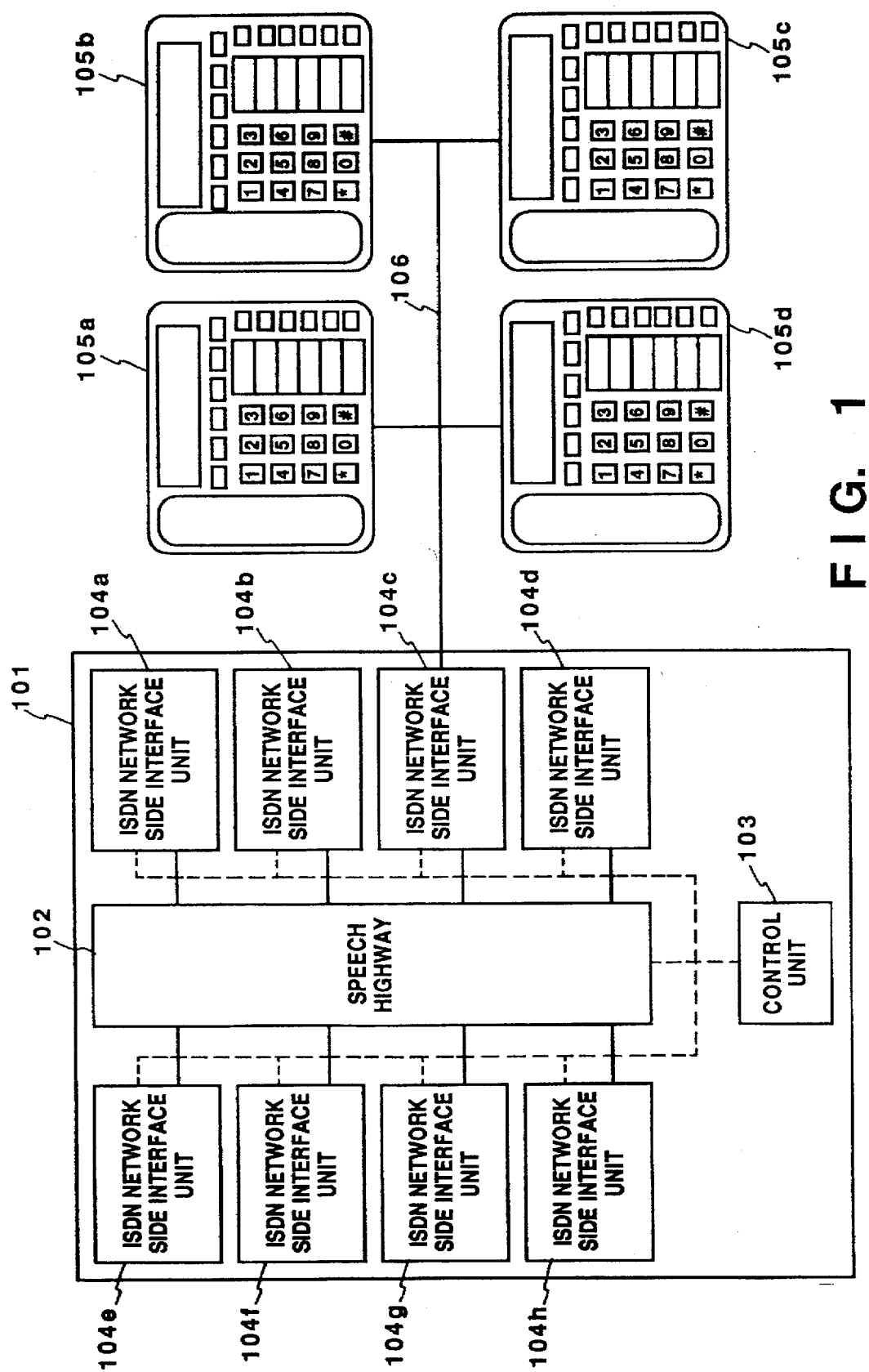

FIG. 1 is a connection diagram of a telephone exchange apparatus and terminals. Numeral 101 denotes a telephone exchange apparatus; 102, a speech highway; 103, a control unit for controlling the telephone exchange apparatus 101; 104a–104h, ISDN network side interface units; 105a–105d, telephones as ISDN terminals connected to the interface unit 104; and 106, a transmission path.

Figure 2:
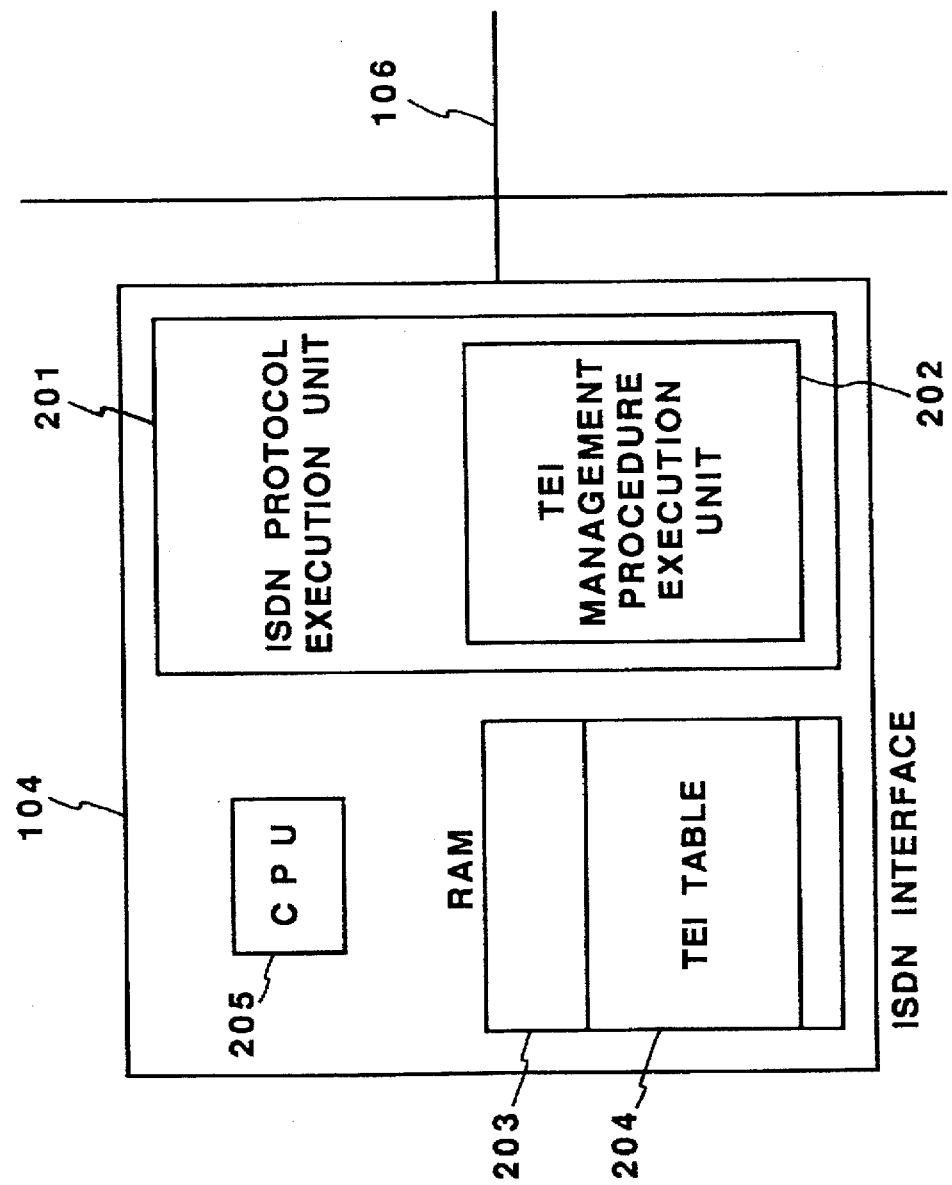
FIG. 2 is a block diagram of an interface unit of FIG. 1.

FIG. 2 is a block diagram of the interface unit 104. Numeral 201 denotes an ISDN protocol execution unit; 202, a TEI management procedure execution unit; 203, a RAM (serves as data-storage); 204, a TEI table in the RAM 203 for storing in-use/not-in-use status of TEI's; and 205, a CPU which controls the execution units and manages the table 204.

FIG. 3 illustrates the structure of the TEI table 204. The table is composed of TEI fields and TEI status fields. In the TEI fields, TEI values 1–63 are stored in numerical order. In each TEI status field, the TEI's "in-use" or "not-in-use" status is stored.

Hereinafter, control procedures of the control unit 103 in the telephone exchange apparatus 101 will be described as first and second embodiments.

[First Embodiment]

Figure 4:
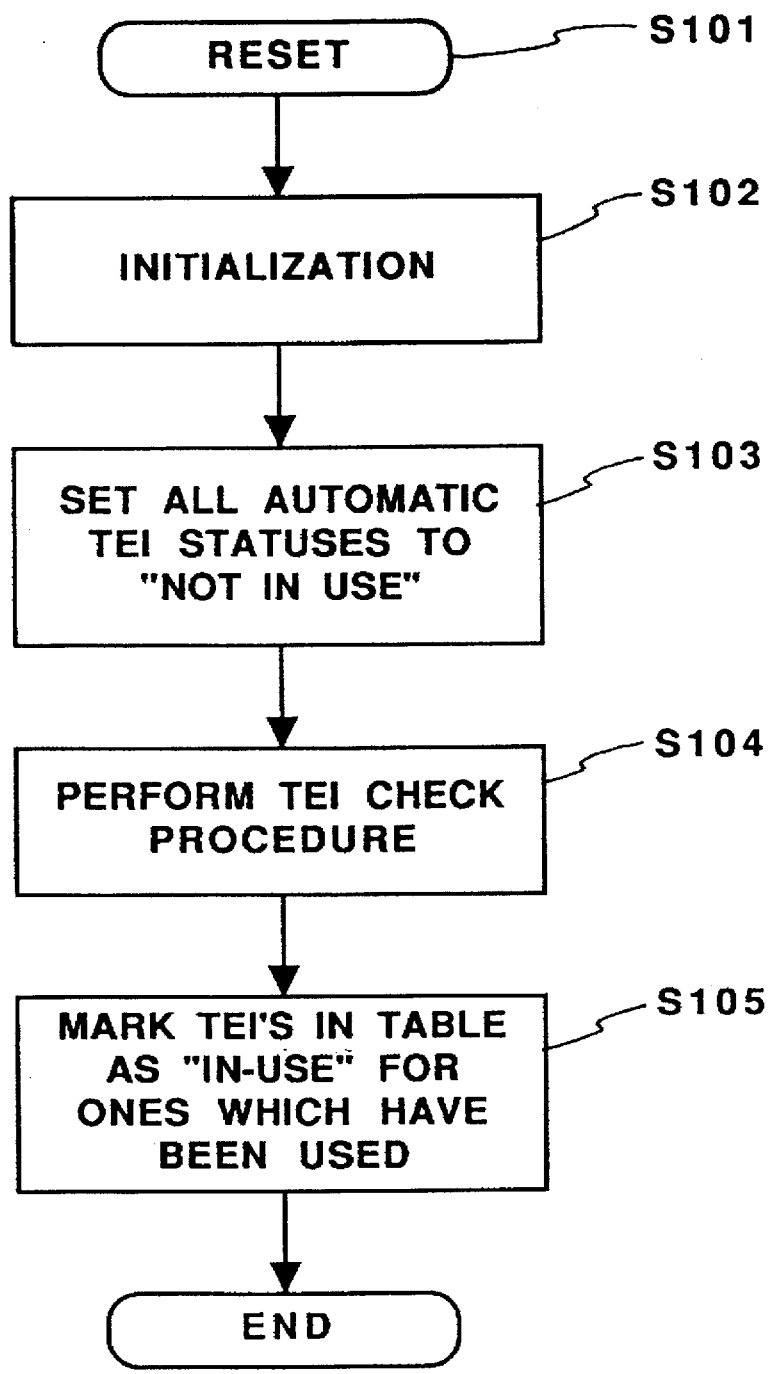
FIG. 4 is a flowchart showing control procedure of a first embodiment.

FIG. 4 is a flowchart showing the control procedure in the telephone exchange apparatus 101 according to the first embodiment.

The control procedure of FIG. 4 starts when the telephone exchange apparatus 101 has been reset due to some malfunctions. In step S101, the CPU 205 detects that the interface unit 104 has been reset by the control unit 103. In step S102, the CPU 205 controls the TEI management procedure execution unit 202 in the interface unit 104 to perform initialization processing. In step S103, the CPU 205 resets the TEI table 204 by setting all the TEI statuses to "not-in-use" (=0), then in step S104, controls the TEI management execution unit 202 to perform the TEI check procedure. The TEI management execution unit 202 checks all the TEI values with this procedure.

FIG. 5 shows the TEI check procedure based on the CCITT Recommendation Q.921. In the figure, SAPi denotes service access point identifier (=63); Ai, action indicator; Ri, a reference indicator;( ), contents of the data link layer command address field; and [], contents of the data link layer information field.

Referring to FIG. 5, the interface unit 104 as layer management entity on the network side is referred to as the ASP (assignment source point). The ASP transmits a message containing message type (=identity check request) and Ai field which contains the TEI value to be checked or the value 127 when all TEI values are to be checked.

A timer in the ISDN Protocal execution unit 201 is used for monitoring this process. If any user terminal equipment 105 has been assigned the TEI value specified in the identity check request message, it responds by transmitting a message containing the following elements; message type (=identity check response), the TEI value in the Ai field and reference number (Ri).

As a result of this check procedure, when it is confirmed that any one TEI is in-use, the TEI management execution unit 202 marks a corresponding field in the TEI table 204 as "in-use" in step S105. As the other TEI fields have been reset in step S 103, they will be kept as "not-in-use" as long as the corresponding TEI's are not-in-use.

Thus, inconsistency of TEI assignment is removed between the interface side and the terminals. More specifically, when the terminal was assigned with a TEI value, then the exchange apparatus 101 is reset and the resultant inconsistent status, that the network side recognizes the TEI value as "not-in-use" while the terminal side recognizes as "in-use", will be removed by executing the TEI check procedure (S104) and updating the TEI table (S105) on the basis of the result of the check procedure. In other words, the first embodiment enables the exchange apparatus 101 without TEI identity verify function according to the CCITT Recommendation, which is optional, to re-establish a communication link using a TEI value which has been assigned before the reset of the exchange apparatus. Furthermore, while the conventional exchange apparatuses need the executions of both the TEI identity verify and TEI removal procedures, the present apparatus which eliminates these two procedures enables the quick re-establishment of communication link, thus preventing from time over of the the reception response timer.

[Second Embodiment]

The control procedure of the first embodiment is characterized in that the TEI table 204 is updated in accordance with (consistent with) the usage statuses of TEI values which were assigned to the terminals before the exchange apparatus is reset. The second embodiment which will be described below is characterized in that the TEI table is forced to reset and all the terminals are set into "not assigned status" with TEI value by using the TEI removal procedure.

Figure 6:
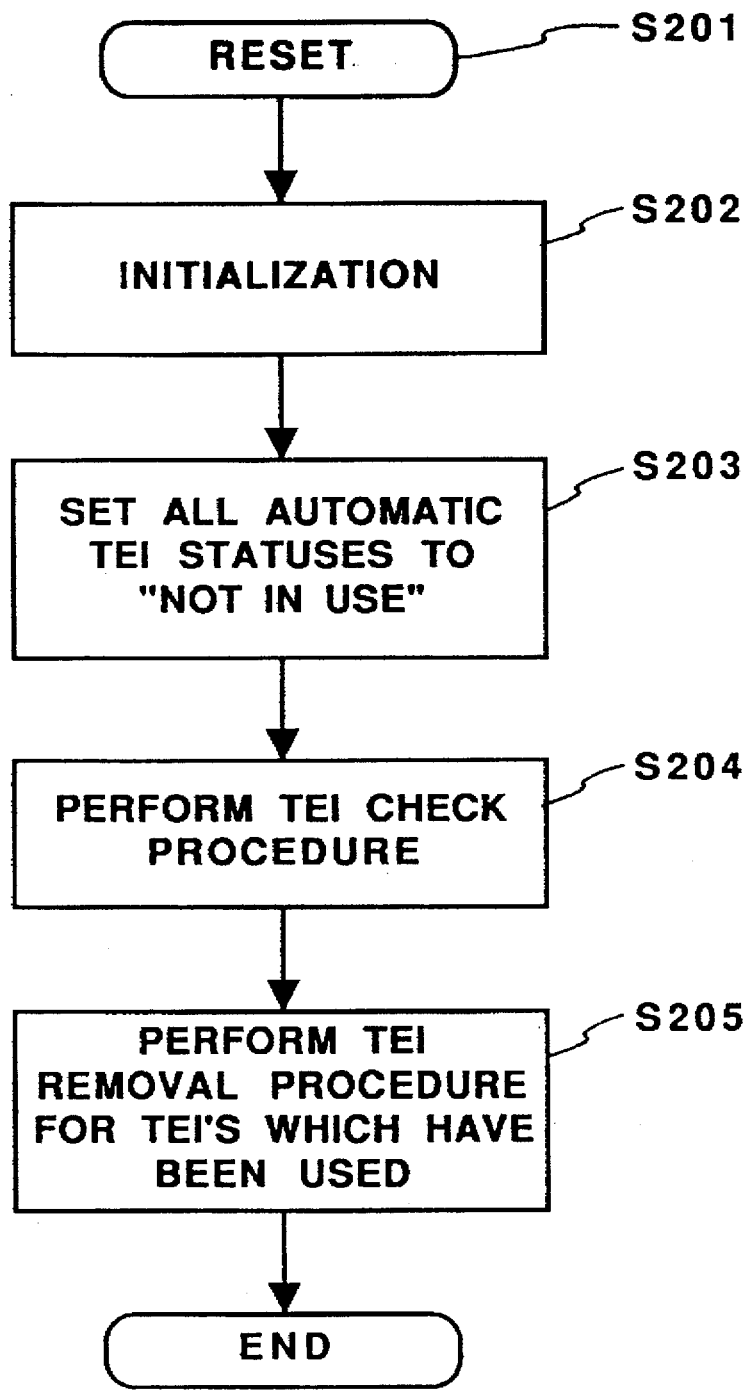
FIG. 6 is a flowchart showing control procedure of the second embodiment.

FIG. 6 is a flowchart showing the control procedure by the telephone exchange apparatus 101 according to the second embodiment.

In step S201, the interface unit 104 is reset by the control unit 103 due to some malfunctions in the telephone exchange apparatus 101. The CPU 205 controls the TEI management execution unit 202 in the interface unit 104 to perform initialization in step S202, then resets the TEI status field in the table 204 in step S203. In following step S204, the CPU 205 checks all the TEI values by controlling the TEI management execution unit 202 to perform the TEI check procedure on the ISDN transmission path 106. If it is confirmed that any one TEI is in-use, the CPU 205 controls the TEI management execution unit 202 to perform the TEI removal procedure on the ISDN transmission path 106 to remove the TEI which is indicative of in-use in step S205.

The TEI removal procedure executed in step S205 will now be described. When the removal procedure is determined to be initiated, the interface 104 transmits a message containing the following elements and issue an MDL-REMOVE-REQUEST primitive which instructs the data link layer entity used to enter the TEI-unassigned status: a) message type (=identity remove); and b) TEI value which is to be removed, as indicated in the Ai field (the value 127 indicates that all terminals 105 should remove their TEI values, otherwise, the specific TEI value should be removed). The Identity remove message is sent twice in succession, to overcome possible message loss. When the terminal side layer management entity 105 determines that the removal of a TEI value is necessary, it instructs the data link layer entity 104 to enter the TEI-unassigned status, using the MDL-REMOVE-REQUEST primitive. This action will be taken for all TEI values when the Ai field contains the value of 127.

The terminal 105 receiving the MDL-REMOVE-REQUEST primitive will:
 a) if no DL-RELEASE-REQUEST primitive is outstanding and the user equipment is not in the TEI-assigned status, issue a DL-REQUEST-INDICATION primitive; or b) if a DL-RELEASE-REQUEST primitive is outstanding, issue a DL-RELEASE-CONFIRM primitive. The data link layer entity will then enter the TEI-unassigned status after discarding the contents of both Unnumbered Identity check request frame (UI) and Identity check request frame (I) which are stored in the ISDN network side interface unit 104 as queues.

According to the second embodiment, when the interface unit 104 is reset, the TEI removal procedure removes all TEI's which are confirmed to have been assigned before the reset of the interface unit 104 from the ISDN terminals 105a–105h. Therefore the contents of the TEI table 204 are consistent with the unassigned statuses of the terminal 105. The ISDN terminals 105 no longer issue a communication link setting request with the "unassigned" TEI, instead start the TEI assignment procedure. As a result, the terminals 105 can perform the communication link setting request and ensuring communication link setting with a re-assigned TEI.

The second embodiment requires the TEI removal procedure which is additional. Compared with the first embodiment, it allows the exchange apparatus without TEI identity verify function according to the CCITT Recommendation to re-establish a link, as the first embodiment can do.

Furthermore, as the second embodiment does not require the TEI identity verify procedure according to the CCITT, it enables the quick re-establishment of communication link, thus preventing the time over of the timer T303.

The present invention is not limited to the preferred embodiments where the present invention is adapted to an ISDN interface. More specifically, the TEI check procedure and the TEI removal procedure of the above embodiments are based on the CCITT Recommendation, however, the present invention can be applied to any communication system comprising a plurality of terminals connected to a single bus which performs a terminal identifier assignment procedure for identifying the connected terminals, an identifier check procedure and an identifier removal procedure which are not based on the CCITT Recommendation.

The present invention is not limited to the above embodiments and various changes and modifications can be made within the spirit and scope of the present invention. Therefore, to apprise the public of the scope of the present invention, the following claims are made.

What is claimed is:

1. A communication control apparatus connected to at least one other communication unit for controlling communication among a plurality of terminals connected to a data transmission path, said communication being made through the data communication path, comprising:

storage means for storing terminal identifiers identifying each of the plurality of terminals;

reset means for resetting the terminal identifiers stored in said storage means when said communication control apparatus is reset by the at least one other communication unit; and performing means for performing a check procedure with the plurality of terminals through the data transmission path to confirm the terminal identifiers of the plurality of terminals when the terminal identifiers stored in said storage means are reset.

2. The apparatus according to claim 1, wherein said performing means further comprises means for rewriting said storage means so that a terminal identifier which is confirmed to have been used is indicative of in-use.

3. The apparatus according to claim 1, wherein said performing means further comprises means for commanding the plurality of terminals to release terminal identifiers which are confirmed to have been used.

4. The apparatus according to claim 1, wherein the terminal identifiers are Terminal Endpoint Identifiers according to an ISDN interface.

5. The apparatus according to claim 2, wherein the terminal identifier is a Terminal Endpoint Identifier according to an ISDN interface and wherein said performing means performs TEI check and TEI removal procedures according to the ISDN interface.

6. The apparatus according to claim 3, wherein the terminal identifier is a Terminal Endpoint Identifier according to an ISDN interface and wherein said performing means performs TEI check and TEI removal procedures according to the ISDN interface.

7. A communication exchange system having an exchange for exchanging communication paths between a plurality of terminals and an external network, the system comprising:

storage means for storing terminal identifiers identifying each of said plurality of terminals:

an exchange controller connected to the storage means;

assigning means for assigning a terminal identifier to a terminal;

resetting means for resetting said storage means and said exchange; and restart means operative, after the resetting of said storage means when the exchange controller generates a reset command, to perform a check procedure with the plurality of terminals to confirm terminal identifier assignment statuses, and for restarting communication between said exchange and the plurality of terminals by setting said storage means to be in agreement with the confirmed terminal identifier assignment statuses of the plurality of terminals.

8. The system according to claim 7, wherein said restart means further comprises means for initializing the plurality of terminals as identifier unassigned.

9. The system according to claim 7, wherein said restart means further comprises means for rewriting said storage means so that the stored data of said storage means may indicate terminal identifiers which are confirmed to have been assigned by said restart means.

10. The system according to claim 7, wherein said restart means performs the check procedure according to an ISDN interface.

11. The system according to claim 7, wherein the terminal identifiers are Terminal Endpoint Identifiers according to an ISDN interface.

12. The system according to claim 1, wherein said performing means performs the check procedure according to an ISDN interface.

13. A communication control apparatus for controlling communication among a plurality of terminals connected to a data transmission path, said communication being made through data transmission path, each terminal having a releasable identifier that identifies the terminal, and said communication control apparatus being connected to at least one other communication unit, comprising:

storage means for storing the terminal identifiers;

detection means for detecting a reset signal from the at least one other communication unit;

reset means for resetting said storage means when said detection means detects the reset signal; and performing means for performing a removal procedure through the data communication path and for commanding the plurality of terminals to release the identifiers of the plurality of terminals when said detection means detects the reset signal.

14. The apparatus according to claim 13, wherein said performing means performs a check procedure for confirming the terminal identifiers of the plurality of terminals, and performs the removal procedure for commanding the plurality of terminals to release a terminal identifier which has been confirmed.

15. An administering method in an interface, for administering terminal identifiers stored in a memory identifying each of a plurality of terminals, the interface being connected with the plurality of terminals, and being controlled under a control of a control unit, said method comprising the steps of:

resetting the terminal identifiers stored in said memory in accordance with detection of a reset signal from the control unit to clear the terminal identifiers stored in said memory;

performing a check procedure with the plurality of terminals for confirming terminal identifiers which have been used by terminals before the terminal identifiers stored in the memory are reset in said resetting step, in accordance with the detection of the reset signal; and storing the terminal identifiers which are confirmed by the check procedure to have been used by the terminals and which have been reset in said resetting step, into said memory.

16. The method according to claim 15, further comprising a step of resetting the memory in accordance with a detection of the reset signal.

17. The method according to claim 15, further comprising a step of writing data in the memory in accordance with a confirmation result of the performed check procedure.

18. The method according to claim 15, further comprising a step of performing a removal procedure for commanding the plurality of terminals to release respective terminal identifiers of terminals which have been confirmed by the performed check procedure.

19. The method according to claim 18, wherein the removal procedure is performed according to an ISDN interface.

20. The method according to claim 15, wherein the check procedure is performed according to an ISDN interface.

21. An administering method in an interface, for administering terminal identifiers stored in a memory identifying each of a plurality of terminals, the interface being connected with the plurality of terminals, and being controlled under a control of a control unit, said method comprising the steps of:

detecting a reset signal from the control unit;

resetting the memory in accordance with a detection of the reset signal; and performing a removal procedure according to an LSDN interface for setting the plurality of terminals into identifier unassigned status in accordance with the detection of the reset signal.

22. A communication exchange system comprising:

a terminal interface for connecting a plurality of terminals;

exchange means for exchanging communication paths of the plurality of terminals; and control means for controlling said exchange means, wherein said terminal interface includes;

memory means for storing terminal identifiers identifying the plurality of terminals, and processing means for resetting said memory means, performing a check procedure with the plurality of terminals to confirm the terminal identifiers of the plurality of terminals and performing a removal procedure for commanding the plurality of terminals to release terminal identifiers of the plurality of terminals which are confirmed by the check procedure in accordance with a reset signal from said control means.

23. A system according to claim 22, wherein said processing means performs the removal procedure according to an ISDN interface.

\* \* \* \* \*

UNITED STATES PATENT AND TRADEMARK OFFICE
CERTIFICATE OF CORRECTION

PATENT NO. : 5,732,070

DATED : March 24, 1998

INVENTOR(S) : SHIGERU HIROKI

It is certified that error appears in the above-identified patent and that said Letters Patent is hereby corrected as shown below:

<u>ON THE COVER PAGE AT [56] REFERENCES CITED,
FOREIGN PATENT DOCUMENTS</u>

Insert --A 61-208997   9/1986   Japan--.

<u>COLUMN 3</u>

Line 52, "Protocal" should read --protocol--.
Line 64, "S 103," should read --S103,--.

<u>COLUMN 4</u>

Line 35, "following" should read --the following--.
Line 46, "issue" should read --issues--.

<u>COLUMN 7</u>

Lines 32-39, Claims 18 and 19, in their entirety, should be deleted.

UNITED STATES PATENT AND TRADEMARK OFFICE
CERTIFICATE OF CORRECTION

PATENT NO. : 5,732,070

DATED : March 24, 1998

INVENTOR(S) : SHIGERU HIORKI

It is certified that error appears in the above-identified patent and that said Letters Patent is hereby corrected as shown below:

<u>COLUMN 8</u>

Line 12, "LSDN" should read --IDSN--.
    Line 14, "identifier unassigned" should read
      --identifier-unassigned--.

Signed and Sealed this

Ninth Day of November, 1999

Attest:

Q. TODD DICKINSON

Attesting Officer     Acting Commissioner of Patents and Trademarks